United States Patent
Skvirski (10) Patent No.: US 9,213,734 B2
(45) Date of Patent: Dec. 15, 2015

(54) METHOD AND SYSTEM FOR STORING AND RETRIEVING DATA

(71) Applicant: Alexei Skvirski, Düsseldorf (DE)

(72) Inventor: Alexei Skvirski, Düsseldorf (DE)

(73) Assignee: RICOH COMPANY, LTD., Tokyo (JP)

( * ) Notice: Subject to any disclaimer, the term of this patent is extended or adjusted under 35 U.S.C. 154(b) by 146 days.

(21) Appl. No.: 13/776,933

(22) Filed: Feb. 26, 2013

(65) Prior Publication Data

US 2013/0246369 A1    Sep. 19, 2013

(30) Foreign Application Priority Data

Mar. 13, 2012  (EP) .................................. 12159331

(51) Int. Cl.
*G06F 17/30* (2006.01)
(52) U.S. Cl.
CPC .... *G06F 17/30359* (2013.01); *G06F 17/30289* (2013.01)
(58) Field of Classification Search
CPC ..................... G06F 17/30359; G06F 17/30289
USPC .................................. 707/688, 791, 802, 803
See application file for complete search history.

(56) References Cited

U.S. PATENT DOCUMENTS

| | | | | |
|---|---|---|---|---|
| 7,062,516 B2* | 6/2006 | Bhat | | 707/694 |
| 7,840,285 B2* | 11/2010 | Wilson et al. | | 700/11 |
| 2005/0223102 A1* | 10/2005 | Zhang et al. | | 709/228 |
| 2009/0150289 A1 | 6/2009 | Joe et al. | | |
| 2010/0011100 A1* | 1/2010 | Kaneko et al. | | 709/224 |
| 2010/0161796 A1* | 6/2010 | Motoyama et al. | | 709/224 |
| 2011/0119313 A1* | 5/2011 | Sung et al. | | 707/802 |
| 2012/0214472 A1* | 8/2012 | Tadayon et al. | | 455/418 |

FOREIGN PATENT DOCUMENTS

WO    WO2008/065638 A2    6/2008

OTHER PUBLICATIONS

Metso Automation, "DNAfieldAssessor Device Performance Monitoring", Sep. 2008, pp. 1-4.*
Metso Automation, "Metso DNA Field Device Manager and Condition Monitoring", Mar. 2011, pp. 1-4.*
The Extended European Search Report dated Jun. 8, 2012.

* cited by examiner

*Primary Examiner* — Apu Mofiz
*Assistant Examiner* — Jared Bibbee
(74) *Attorney, Agent, or Firm* — IPUSA, PLLC (57) ABSTRACT

A method of accessing data in a database management system includes in a first storage structure, storing one or more datasets for each of plural devices, each dataset comprising unordered timestamped data elements indicating statuses of a particular device related condition at different points in time, in a second storage structure, storing and mapping between: device identifiers identifying the devices, condition identifiers identifying the device related conditions, and timestamps identifying when two temporally consecutive data elements of a given dataset indicate different statuses, receiving a new data element indicating a status of one particular device related conditions, storing the new data element in the first storage structure, determining whether or not the status indicated by the new data element is different from the status indicated by a temporally preceding data element stored in first storage structure, and updating the timestamps if the determination is positive.

12 Claims, 4 Drawing Sheets

FIG. 1

Reporting time period 101

METHOD AND SYSTEM FOR STORING AND RETRIEVING DATA

BACKGROUND OF THE INVENTION

1. Field of the Invention

Embodiments described herein generally relate to storing and retrieving data, particularly, but not exclusively, data about networked office equipment.

2. Description of the Related Art

Many modern day electronic devices, such as printers, copiers, scanners, and multi-function devices (MFDs) have the ability to generate device usage and other data. Often, such devices are provided with network connections so that the data can be periodically transmitted to a central database for subsequent analysis. As the number of devices, as well as the number of device parameters to which the data pertains, can be large, the amount of data collected over time can be vast.

Although many conventional systems in widespread use today, such as relational database management systems, have the ability to store vast amounts of data collected over time (i.e. time-varying data), the rules governing transactions in relational databases offer very little built-in support to adequately analyze it. In other words, queries for historical data are difficult in a relational database. To resolve this issue, separate analytical structures are often used. Thus, the data can be stored in a relational database, whereas the analysis is performed by a tightly coupled analytical counterpart. However, existing implementations, particularly those for enterprise printing systems, make use of vendor-specific and/or complex queries that consume computer resources to a degree that significantly reduces system performance.

SUMMARY OF THE INVENTION

The present invention may provide a method and system for storing and retrieving data that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a method and system for storing and retrieving data particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a method of accessing data in a database management system, the method including: in a first data storage structure, storing one or more datasets for each of a plurality of devices, each dataset comprising unordered timestamped data elements that indicate statuses of a particular device related condition at different points in time; in a second data storage structure, storing and mapping between: device identifiers that identify the devices, condition identifiers that identify the device related conditions, and timestamps that identify when two temporally consecutive data elements of a given dataset indicate different statuses; receiving a new data element indicating a status of one particular device related conditions; storing the new data element in the first data storage structure; determining whether or not the status indicated by the new data element is different from the status indicated by a temporally preceding data element stored in first data storage structure; and updating the timestamps if the determination is positive.

Other objects, features and advantages of the present invention will become more apparent from the following detailed description when read in conjunction with the accompanying drawings.

DETAILED DESCRIPTION OF THE PREFERRED EMBODIMENTS

Printing devices may maintain a set of internal, digitally controlled "gauges", also known as "sensors". Such sensors detect, either directly or indirectly, events occurring at the devices. Such events are often software events, such as the triggering of signals (warning signals, fault signals and so on), generated by software applications or software modules of the device. The software events, in turn, reflect detected hardware events, such as scanning, printing and copying events. The occurrences (or not) of these events can be indicative of the operational statuses of the printing devices, and in particular may reflect the operational statuses of different device related conditions of the printing devices at different points in time.

Printing devices may transmit data about the events to a data repository where it is stored for later data processing, thereby enabling analysis of the operational statuses of the printing devices as a function of time.

Figure 1:
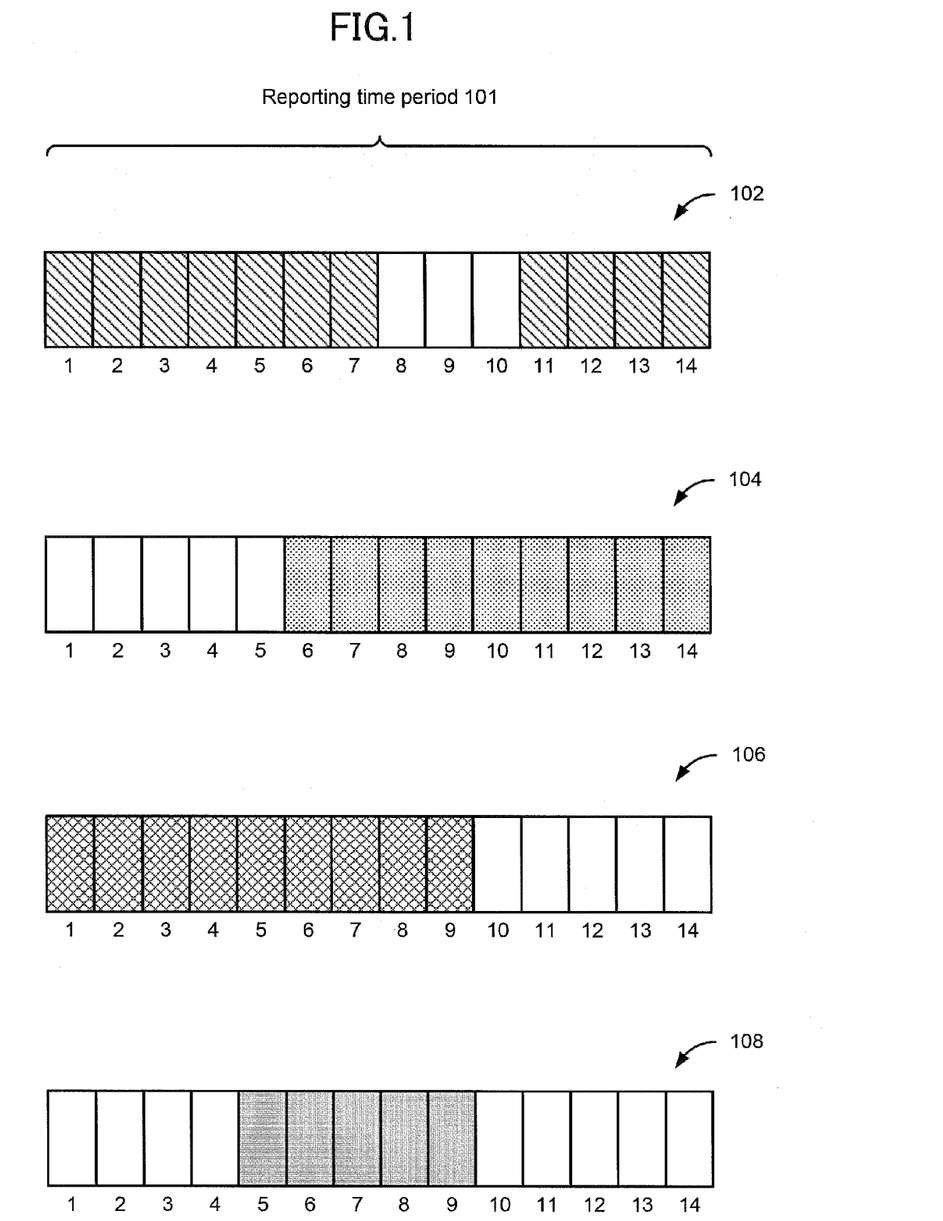
FIG. 1 schematically shows status data values for different device related conditions, according to an embodiment.

FIG. 1 schematically shows data corresponding to four different device related conditions of a printer device, for a reporting time period 101 covering fourteen days, each day being represented as an ordinal integer. It will be appreciated that, in practice, other reporting time periods are possible, that time intervals other than days may be used, and that timestamps may be used instead of ordinal integers. Data elements are denoted by lined, dotted, cross-hatched, solid shaded and solid white blocks. The data elements may be logically grouped based on the device related condition. In this particular example, group 102 corresponds to a "printer cover" condition, group 104 corresponds to a "paper quantity" condition, group 106 corresponds to a "toner quantity" condition, and group 108 corresponds to a "service call" condition. Thus, the lined blocks of group 102 represent data elements corresponding to the detection of a "printer cover open" status, the dotted blocks of group 104 represent data elements indicating the detection of a "paper level low" status, the cross-hatched blocks of group 106 represent data elements indicating the detection of a "toner level low" status, and the solid shaded blocks of group 108 represent data elements indicating the detection of a "service call" status. The solid white blocks of the groups are data elements indicating statuses different from the statuses noted above, for example a "printer cover closed" status, a "paper level acceptable" status, a "toner level acceptable" status, and a "no service call made" status, respectively. It will be appreciated that, in some cases, a status may not have a direct counterpart. As such, the solid white blocks for each group may simply indicate a "recovered" status, i.e. "paper jam recovered" or "service call recovered".

While the status indicated by a data element may be determined based on a detection of the status at the device, the absence of such detection may be an indication that the status has not changed or that the status information was not available. Furthermore, there may be more than two statuses, for example "paper low", "paper out" and "paper full", in the case of the paper quantity condition.

Although the regularity with which devices transmit their data may be controlled, predicting the nature and timing of events occurring at the printing devices is, in general, not possible. For example, while the lifecycle of a hardware component may be known, and although it may be assumed that failure rates are high at the end of the lifecycle (wear-out), predicting exactly when a failure may occur is difficult. Similarly, although it may be assumed that failure rates of software components drop over time (as more bugs are detected and removed), random failures cannot be predicted. This unpredictability means that, for any given point in time (or period of time), it is difficult to determine the operational status or statuses of the printing devices without reference to the stored data. In particular, determining whether or not a status change has occurred generally requires a search for a data element indicative of a first status, and a search for another data element indicative of a second status.

Searching vast amounts of data collected over time is computationally expensive, and this problem increases multiple-fold when searches need to be performed in respect of multiple devices and/or multiple device related conditions. More specifically, extending the search operation to N printing devices each having M independent device related conditions could require at least $N \times M^2$ searches, as the data for each condition could require $M^2$ searches. That is because a search operation does not search for a single data element, but rather pairs of data elements (contiguous in time), in order to determine whether the status of the $M^{th}$ condition of the $N^{th}$ device has changed from a first status to a second status. For example, M searches are performed to find the $m^{th}$ data element indicative of the current status for each of the M conditions, and then a further M searches are performed to find the data element indicative of the preceding status for each of the M conditions, i.e. the $(m-1)^{th}$ data element, in order to determine whether or not there has been a change. (In FIG. 1, M=4 and m=14.) This requires M×M searches, so that $N \times M^2$ is the minimum amount of searches that need to be performed given that two "passes" are required to determine changing conditions.

However, the process may need to be repeated for other data element pairs, for example (m-1, m-2), (m-2, m-3), (m-3, m-4) and so on, until two data elements indicating a status change are found. Further still, for a given reporting time period, multiple status changes may occur, so that all of the data elements for that reporting time period need to be searched since status changes may occur randomly. Although the precise mathematical details are beyond the scope of this disclosure, other than to say that one or another form of quadratic dependency may be involved, it will be appreciated the aforementioned searching renders the method computationally unfeasible, especially when dealing with large numbers of printing devices and device related conditions, e.g. N=100 . . . 1000 and M>30. Also, it will be appreciated that a search may require reading many thousands of data values not necessarily ordered with regard to time. For example, relational data structures assume the data has no structure or relationship other than those explicitly defined in the database. In other words, relational data structures have no "understanding" that the stored data is part of time-varying data collection.

Figure 2:
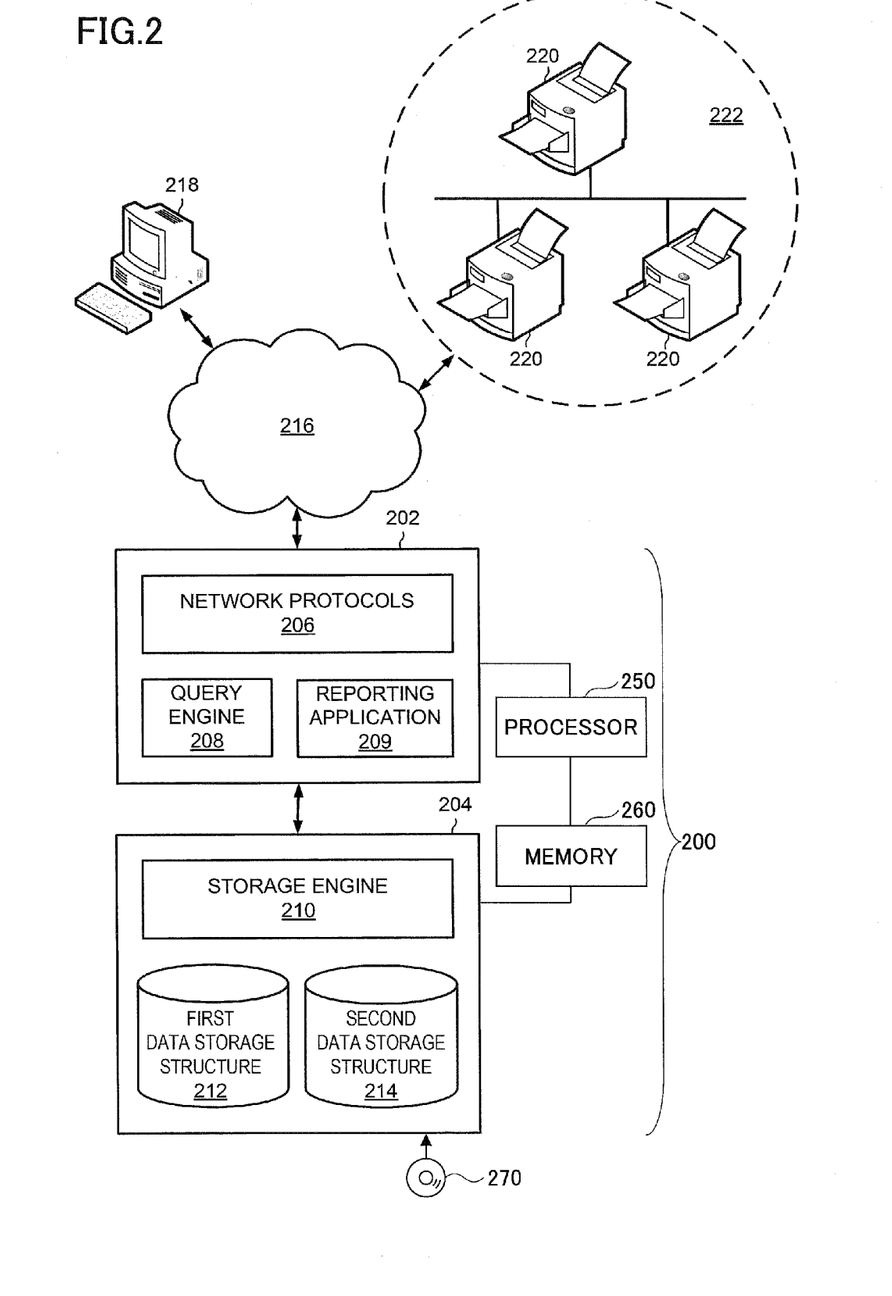
FIG. 2 schematically shows a database management system, according to an embodiment.

FIG. 2 schematically shows a database management system 200, which, broadly speaking, functions to collect and store data obtained from printing devices 220 of an infrastructure 222, and to provide a means of accessing the stored data by the end-user 218 in a computationally efficient manner. The database management system 200 comprises a database server 202 and a data storage system 204, though these do not have to be separate sub-systems as shown. Furthermore, any separation need not be "physical", i.e. they may be integrated.

The database server 202 comprises network protocols 206, a query engine 208 and a reporting application 209. The network protocols 206 provide the functions of connection handling, authentication, security, and so forth over network 216. The network 216 can be a wide area network such as the Internet. The query engine 208 is responsible for query optimization and execution. Its components may comprise a parser, a query optimizer, and a query executor (not shown). In brief, the parser primarily functions to check query syntax. The query optimizer determines how to retrieve the data as quickly and efficiently as possible. It may, for example, choose from among several different ways to execute the query, and then creates a plan of execution that can be understood by the query executor. The query executor then interprets the execution plan and, based on the information it has received, makes requests of the other components of the system, such as the storage engine 210 of the data storage system 204, to retrieve the data. Once the data is retrieved, it is passed to the reporting application 209 for presentation to the end-user.

The data storage system 204 comprises a storage engine 210, which is responsible for the efficient storage to and retrieval of data from the first and second data storage structures 212, 214. The database server 202 communicates with the storage engine 210 through a storage engine application programming interface (API) (not shown). The data storage system 204 may include a network interface for transmitting and receiving data via network 216 (i.e. not through database server 202) to and from the printing devices. Systems 202, 204 may be implemented as data processing system having at least one processor 250. In one embodiment, the at least one processor 250 is a conventional processing device, such as a general-purpose microprocessor. The data processing system also includes a memory 260, which includes program instructions or functional units that implement the aforementioned features, such as the query engine 208 and the storage engine 210. The program instructions or functional units that implement the aforementioned features (e.g., query engine 208, storage engine 210) may be recorded in a carrier medium such as a computer-readable recording medium 270 illustrated in FIG. 2.

In order to generate a report, the end-user 218 formulates and submits a query to database server 202. In embodiments, the database management system 200 uses the Structured Query Language (SQL). In SQL, queries refer to a widely available set of SQL commands called clauses. Each clause (command) performs some sort of function against the database. In one embodiment, the query comprises a SQL SELECT clause. The query specifies some criteria by which the database server should select data from among all of the data contained in the database system. In one embodiment, the query may specify certain devices and a certain time period. The database server receives and executes the query. In executing the query, the database server forms a result set and sends the result set to the reporting application for 209 for presentation to the end-user. The result set is a selected subset of all of the data in the database system (This is described in more detail below). The result set consists only of the data that satisfied the criteria specified in the query.

Figure 3:
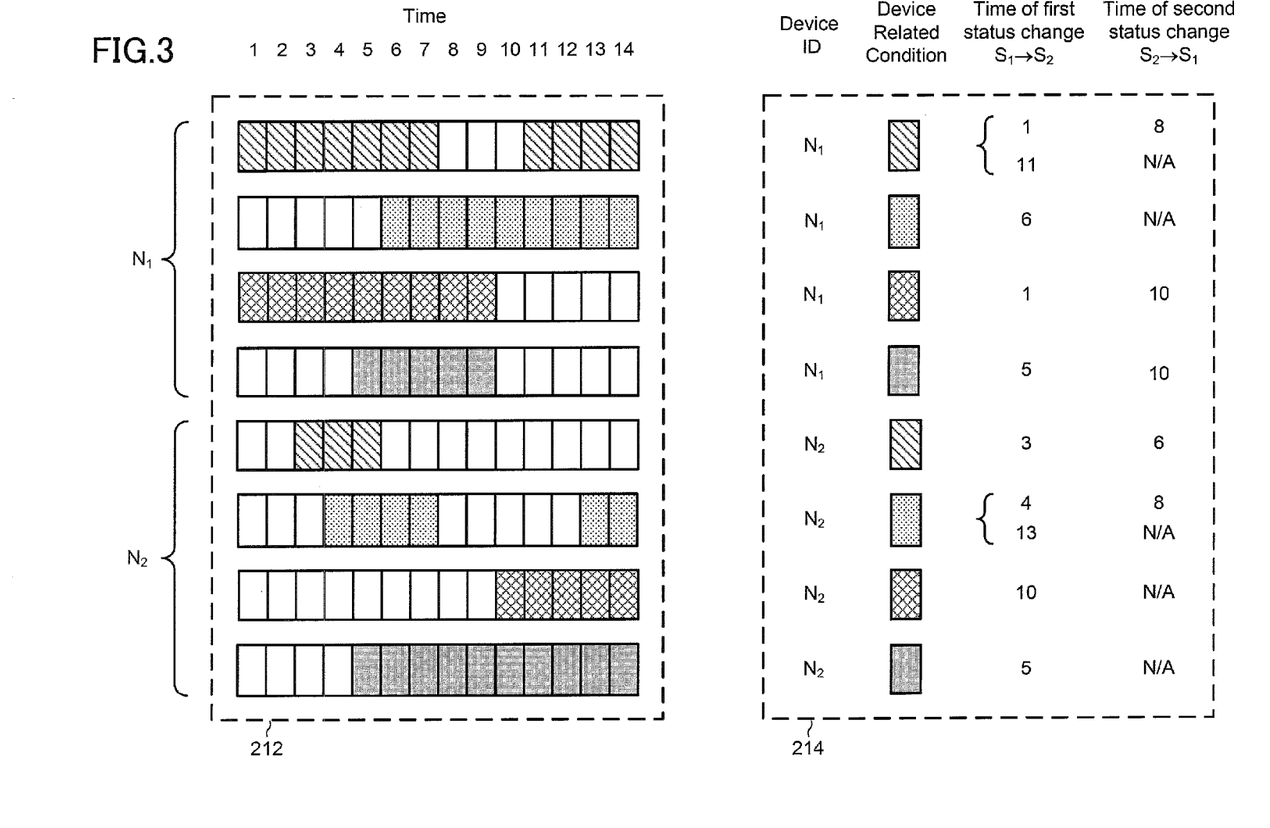
FIG. 3 schematically shows data storage structures, according to an embodiment.

FIG. 3 schematically shows first and second data storage structures 212, 214 according to embodiments.

In one embodiment, first data storage structure 212 is a relational data structure. This is a logical data structure in which data is stored in the form of tables. In one embodiment, the first data storage structure 212 stores data values for device related conditions. In FIG. 3, the data values are represented as "blocks", though it will of course be understood that this is just for the purposes of clarity. For example, the first data storage structure 212 may store the data in columns of a table named Printing Device ID, Status Data Value, and Time Stamp, respectively. Thus, in one embodiment, each row is a record comprising three fields, storing a device identifier, a data value of the status, and timestamp values. Each record includes one or more fields whose content is an index or key, to be used in uniquely identifying the record, i.e. its address. In FIG. 3, the data values for the four device related conditions described with reference to FIG. 1 (printer cover condition, paper quantity condition, toner quantity condition, and service call condition) are shown for two devices $N_1$, $N_2$.

The data values can be collected repeatedly over time at arbitrary or fixed intervals. The frequency, or "granularity", of the time intervals can be seconds, minutes, hours, days, weeks, months, or years, for example every two hours. This may depend on how often the sensors at the devices monitor the device related conditions. Alternatively, or in addition, data values can be collected whenever a sensor detects the occurrence of an event. In all cases, the data value is associated with a point in time, for example by use of timestamps.

In one embodiment, the second data storage structure 214 stores and maps between device identifiers, condition identifiers (shown as the aforementioned "blocks" for convenience), and timestamps. The timestamps that are stored corresponds to time points associated with status changes for the device related conditions. For example, in respect of the service call condition (shaded blocks) of the first device $N_1$, the time data comprises time values "5" and "10", corresponding to the time points of a change from a first status (e.g. service call detected) to a second status (e.g. service call resolved), and then back to the first status, respectively. This renders the aforementioned searching obsolete, as the database management system 200 is able to directly determine the time points at which changes between states have occurred. In one embodiment, when database server 202 receives an SQL query from the end-user 218 via network 216 and network protocols 206, the SQL query is passed to the query engine 208, where it is parsed, optimized and executed. The statuses of the device related conditions are then determined by the storage engine 210 of the data storage system 204 using the second data storage structure 214 and in particular the time data to identify the time points at which events have occurred. The results passed back to the reporting application 209 where it is prepared for presentation to the end-user 218.

Figure 4:
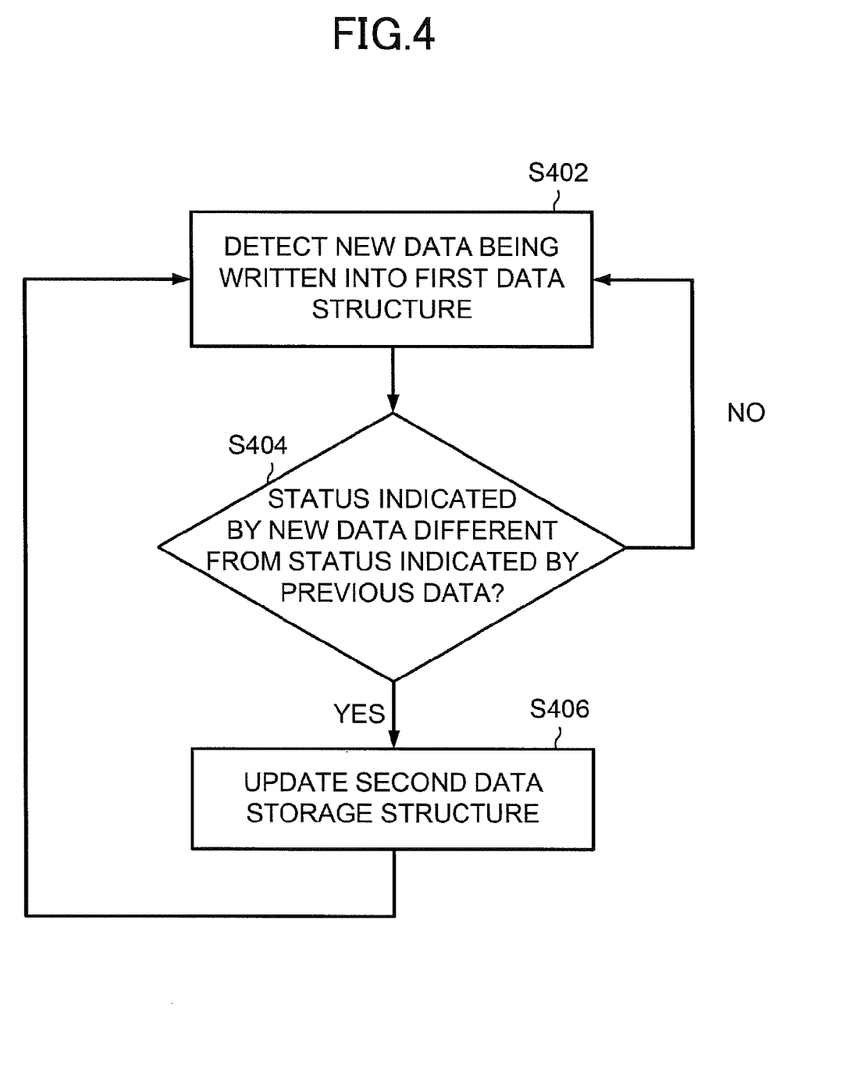
FIG. 4 is a flow chart of a method of updating a data structure, according to an embodiment.

In various embodiments, the second data storage structure 214 is updated in response to new data being written to the first data storage structure 212. A flowchart of this process is shown in FIG. 4, which begins at step S402 with the detection of a data write operation in the primary data storage structure. At step S404, a comparison of the status of the new data with the status of the previous data is performed. Then, one of the following can occur:

1) If the status indicated by the new data element is different from the status indicated by the previous data element, i.e. a problem has been resolved, then the timestamp corresponding to that status change is updated (a delta function) or a further timestamp may be stored (step S406). The process returns to step S402.
2) If the status indicated by the new data element does not have a status condition entry, then a new entry is created in the second data storage structure, preferably for each of the M statuses and N devices (step S406). The process returns to step S402.
3) If the status indicated by the new data element is the same as the status indicated by the previous data element, i.e. no status change has occurred, the process returns to step S402.

In this way, significant reduction in search time can be achieved with only a relatively inexpensive data write operation. It also reduces the computational time of the whole process. In particular, the complexity of the search is reduced from $N \times M^2$ search operations on the data stored in the first data storage structure to $N \times M$ look-up operations in the second data storage structure. This is because there is now no need to search for data element pairs indicating that a status change has occurred.

Although in foregoing embodiments the primary data storage structure in which the status data for each device related condition is stored in a column, in other embodiments the status data for each device related condition can be stored as a dedicated table, as a set of rows in a shared table, or as a single row in a shared table.

Although in foregoing embodiments, the database system is implemented in the context of networked office devices such as printers, copiers, and facsimile devices (or devices providing a combination thereof), it will be appreciated that the database system is relevant to other kinds of devices. Broadly speaking, these kinds of devices provide, or rather posses, different kinds of information in a machine readable digital format, as well as digitally-aware devices, which represent the kinds of devices that possess information content that can be digitized. For example, these sorts of devices can contain, for example optical, mechanical and other data which can be measured, evaluated and converted into a machine-readable electronic format.

Although in foregoing embodiments the timestamps are associated with time points (i.e. a specific instant in time, based on the precision of the data type), in other embodiments the timestamp may be associated with time intervals.

Although in foregoing embodiments SQL queries are used to specify information to be retrieved, in other embodiments the queries can be formulated in other query languages.

It will be understood that a storage location address may not describe a physical location; instead, it used as a means to request information from a controller. The controller converts the request from a logical to a physical address that is able to retrieve the data from an actual physical location on the storage device.

Hence, as described above, one aspect of the invention provides a database management system, comprising: a first data storage structure for storing one or more datasets for each of a plurality of devices, each dataset comprising unordered timestamped data elements that indicate statuses of a particular device related condition at different points in time; a second data storage structure for storing and mapping between: device identifiers that identify the devices, condition identifiers that identify the device related conditions, and timestamps that identify when two temporally consecutive data elements of a given dataset indicate different statuses, wherein the data storage management system is operable to update the second data storage structure whenever a new data element of one of the datasets indicating a status different from the status indicated by a temporally preceding data element of said one of the datasets is stored in the first data storage structure; and data access means for, in response to receiving a request for data in respect of a specified time period and at least one device related condition of at least one device, using the second data storage structure to identify when one or more status changes occurred within the specified time period for said at least one device related condition.

Using the second data storage structure enables status changes (two temporally consecutive data elements indicating different statuses) to be efficiently and straightforwardly determined, at minimal cost of an update to the second data storage structure when new data indicating a different status is stored in the first data storage structure.

In one embodiment, at least some of the timestamps are associated as pairs in the second data storage structure, the pairs comprising a first timestamp indicating a change from a first status to a second status and a second timestamp indicating a change from the second status to the first status. For example, the first timestamp may indicate the detection of a problem and the second timestamp may indicated a resolution of that problem.

In one embodiment, the update comprises modifying the stored timestamps or adding new timestamps.

In one embodiment, the status indicated by the new data elements corresponds to a device related condition for which no condition identifier is currently stored, the database management system operable to add a new condition identifier to the second data storage structure.

In one embodiment, the database management system comprises a relational database management system in which the first data storage structure comprises a relational data storage structure.

In one embodiment, the request comprises a structured query language, SQL, query. The use of open database standards such as SQL allows the database management system to be widely implemented.

In one embodiment, the database management system is operable to receive new data elements from the plurality of devices over a network via a network interface. The network may be a wide area network such as the Internet or a local area network.

Efficiency gains may be especially pronounced when the number of devices and/or conditions is large, for example when each of the number of devices and the number of the device related conditions is in the tens, hundreds, thousands or more.

One aspect of the invention provides a method of accessing data in a database management system, the method comprising: in a first data storage structure, storing one or more datasets for each of a plurality of devices, each dataset comprising unordered timestamped data elements that indicate statuses of a particular device related condition at different points in time; in a second data storage structure, storing and mapping between: device identifiers that identify the devices, condition identifiers that identify the device related conditions, and timestamps that identify when two temporally consecutive data elements of a given dataset indicate different statuses; receiving a new data element indicating a status of one particular device related conditions; storing the new data element in the first data storage structure; determining whether or not the status indicated by the new data element is different from the status indicated by a temporally preceding data element stored in first data storage structure; and updating the timestamps if the determination is positive.

In one embodiment, the update comprises modifying the stored timestamps or adding new timestamps.

In one embodiment, the status indicated by the new data elements corresponds to a device related condition for which no condition identifier is currently stored, the method further comprising adding a new condition identifier to the second data storage structure.

In one embodiment, the method further comprises: in response to receiving a request for data in respect of a specified time period and at least one device related condition of at least one device, using the second data storage structure to identify status changes occurring within the specified time period for said at least one device related condition.

Embodiments can be in the form of a hardware implementation, a software implementation, or a mixture of both. Thus any of the 'means', 'components', 'parts' and 'units' defined herein can be implemented as code modules in different combination in a computer.

Embodiments encompass a computer program provided as a computer program product on a carrier medium which can include a storage medium and a transient medium or signal. The computer program can be stored on a storage medium such as a solid state memory, an optical disc, a magnetic disc, or tape device. The computer program can be provided on a transient medium or signal in the form of an optical signal, acoustic signal, magnetic signal, radio frequency signal, or electrical signal such as a TCP/IP signal carrying code over the Internet. The computer program product can be involved in the implementation of an embodiment, either as a complete set of computer executable instructions capable of configuring, on its own, the performance of one or more of the embodiments, or as a set of instructions engaging pre-existing operable software components on a computer, to cause the configuration of the computer in the desired manner. The computer program product may be directly executable, or may require local processing, such as decoding, decompression, or compilation, before it is in an executable condition.

In the foregoing detailed description of embodiments, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Although the present invention has been described hereinabove with reference to specific embodiments, it will be apparent to a skilled person in the art that modifications lie within the spirit and scope of the appended claims.

The present application is based on European Priority Application No. 12159331.3 filed on Mar. 13, 2012, the entire contents of which are hereby incorporated by reference.

What is claimed is:

1. A database management system, comprising:
a processor;
a first data storage structure configured to store one or more datasets for each of a plurality of devices, each dataset comprising unordered timestamped data elements that indicate statuses of a particular device related condition at different points in time; and a second data storage structure configured to store and map between:
  device identifiers that identify the devices,
  condition identifiers that identify the device related conditions,
  first timestamps that indicate a change in a device related condition from a first status to a second status, and
  second timestamps that indicate a change in the device related condition from the second status back to the first status;
wherein, in the second data storage structure a device identifier, a condition identifier, a first timestamp that indicates a change in the device related condition from the first status to the second status, and a second timestamp that indicates a change in the device related condition from the second status back to the first status, are each stored together in a same row or a same column of a table;
wherein the database management system is operable to update the second data storage structure whenever a new data element of one of the datasets indicating a status different from the status indicated by a temporally preceding data element of said one of the datasets is stored in the first data storage structure; and
wherein the processor is configured to, in response to receiving a request for data in respect of a specified time period and at least one device related condition of at least one device, use said same row or said same column in the second data storage structure to identify when one or more status changes occurred within the specified time period for said at least one device related condition.

2. The database management system according to claim 1, wherein the update comprises modifying the stored timestamps or adding new timestamps.

3. The database management system according to claim 1, wherein the status indicated by the new data elements corresponds to a device related condition for which no condition identifier is currently stored, the database management system operable to add a new condition identifier to the second data storage structure.

4. The database management system according to claim 1, wherein the database management system comprises a relational database management system in which the first data storage structure comprises a relational data storage structure.

5. The database management system according to claim 1, wherein the request comprises a structured query language (SQL) query.

6. The database management system according to claim 1, wherein the database management system is operable to receive new data elements from the plurality of devices over a network via a network interface.

7. A method of accessing data in a database management system, the method comprising:
  in a first data storage structure, storing one or more datasets for each of a plurality of devices, each dataset comprising unordered timestamped data elements that indicate statuses of a particular device related condition at different points in time;
  in a second data storage structure, storing and mapping between: device identifiers that identify the devices, condition identifiers that identify the device related conditions, first timestamps that indicate a change in a device related condition from a first status to a second status, and second timestamps that indicate a change in the device related condition from the second status back to the first status; wherein, in the second data storage structure a device identifier, a condition identifier, a first timestamp that indicates a change in the device related condition from the first status to the second status, and a second timestamp that indicates a change in the device related condition from the second status back to the first status, are each stored together in a same row or a same column of a table;
  receiving a new data element indicating a status of one particular device related conditions;
  storing the new data element in the first data storage structure;
  determining whether or not the status indicated by the new data element is different from the status indicated by a temporally preceding data element stored in first data storage structure; and
  updating the timestamps if the determination is positive.

8. The method according to claim 7, wherein the update comprises at least one of modifying the stored timestamps and adding new timestamps.

9. The method according to claim 7, wherein the status indicated by the new data elements corresponds to a device related condition for which no condition identifier is currently stored, the method further comprising adding a new condition identifier to the second data storage structure.

10. The method according to claim 7, further comprising: in response to receiving a request for data in respect of a specified time period and at least one device related condition of at least one device, using said same row or said same column in the second data storage structure to identify status changes occurring within the specified time period for said at least one device related condition.

11. A non-transitory computer-readable recording medium for causing a computer to carry out a method for accessing data in a database management system, the method comprising:
  in a first data storage structure, storing one or more datasets for each of a plurality of devices, each dataset comprising unordered timestamped data elements that indicate statuses of a particular device related condition at different points in time;
  in a second data storage structure, storing and mapping between: device identifiers that identify the devices, condition identifiers that identify the device related conditions, first timestamps that indicate a change in a device related condition from a first status to a second status, and second timestamps that indicate a change in the device related condition from the second status back to the first status; wherein, in the second data storage structure a device identifier, a condition identifier, a first timestamp that indicates a change in the device related condition from the first status to the second status, and a second timestamp that indicates a change in the device related condition from the second status back to the first status, are each stored together in a same row or a same column of a table;
  receiving a new data element indicating a status of one particular device related conditions;
  storing the new data element in the first data storage structure;
  determining whether or not the status indicated by the new data element is different from the status indicated by a temporally preceding data element stored in first data storage structure; and
  updating the timestamps if the determination is positive.

12. The non-transitory computer-readable recording medium as claimed in claim 11, wherein the database management system includes a first data storage structure configured to store one or more datasets for each of a plurality of devices, each dataset comprising unordered timestamped data elements that indicate statuses of a particular device related condition at different points in time;
a second data storage structure configured to store and map between:
 device identifiers that identify the devices,
 condition identifiers that identify the device related conditions,
 first timestamps that indicate a change in a device related condition from a first status to a second status, and
 second timestamps that indicate a change in the device related condition from the second status back to the first status;
 wherein, in the second data storage structure a device identifier, a condition identifier, a first timestamp that indicates a change in the device related condition from the first status to the second status, and a second timestamp that indicates a change in the device related condition from the second status back to the first status, are each stored together in a same row or a same column of a table; and
 wherein the database management system is operable to update the second data storage structure whenever a new data element of one of the datasets indicating a status different from the status indicated by a temporally preceding data element of said one of the datasets is stored in the first data storage structure; and
a processor configured to, in response to receiving a request for data in respect of a specified time period and at least one device related condition of at least one device, use said same row or said same column in the second data storage structure to identify when one or more status changes occurred within the specified time period for said at least one device related condition.

* * * * *